Figure 1:
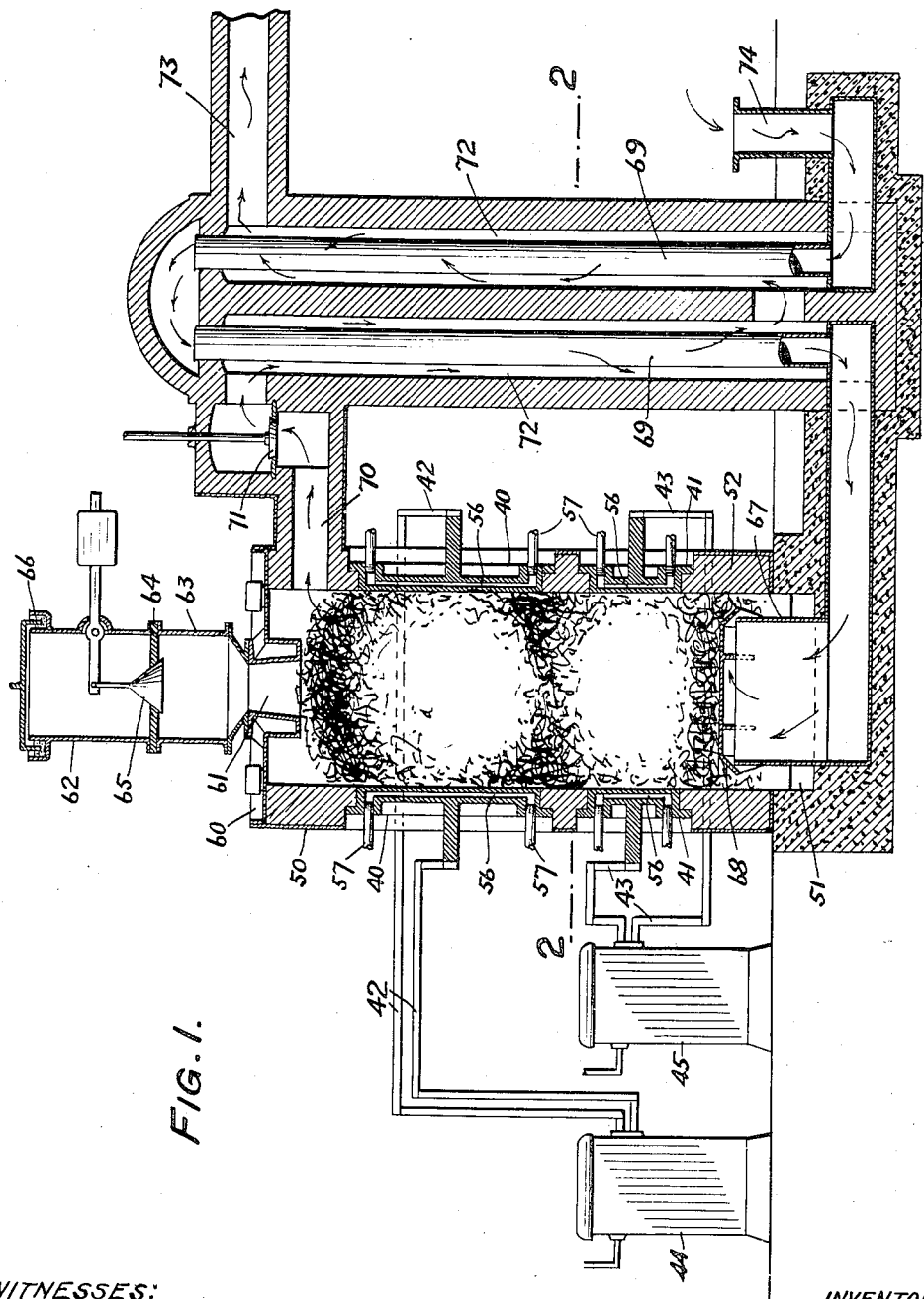

A. BERGLOF.
METHOD OF CARBONIZING AND SUPERHEATING GAS.
APPLICATION FILED NOV. 1, 1910.

1,085,096.

Patented Jan. 20, 1914.
2 SHEETS—SHEET 2.

WITNESSES:

INVENTOR
Algot Berglof
BY Frank L. Busser
ATTORNEY.

UNITED STATES PATENT OFFICE.

ALGOT BERGLOF, OF CHICAGO, ILLINOIS.

METHOD OF CARBONIZING AND SUPERHEATING GAS.

1,085,096. Specification of Letters Patent. Patented Jan. 20, 1914.

Application filed November 1, 1910. Serial No. 590,238.

*To all whom it may concern:*

Be it known that I, ALGOT BERGLOF, a subject of the King of Sweden, residing at Chicago, county of Cook, and State of Illinois, have invented a new and useful Improvement in Methods of Carbonizing and Superheating Gas, of which the following is a full, clear, and exact description, reference being had to the accompanying drawings, which form a part of this specification.

The method forming the subject matter of this application has for its main object, to carbonize, in the reduction of ore spent gas, containing carbon-dioxid ($CO_2$) and water-vapor ($H_2O$) and to produce, for use in the reduction of ores, a gas practically free from nitrogen, carbon-dioxid and oxygen and to superheat such gas to temperatures varying as required up to the highest temperature possible, about 1600–1700° C. The method may also be applied to the manufacture of water gas, and the gas produced may also be used for other purposes than reduction of ores.

It consists, generally speaking, in preheating a spent gas, containing carbon-dioxid and water-vapor or superheated steam, passing said gas through a mass of incandescent coke or charcoal not mixed with any material of foreign nature, such as, for example, iron ore, and in maintaining, in the mass of incandescent coke or charcoal, a temperature of not less than 1000–1100° C., through heat produced in the coke or charcoal itself by electric energy, that is, without the combustion of any part of the fuel with air, without access of air, and, consequently, also without diluting the gas with nitrogen.

To produce in the coke or charcoal itself the heat required to dissociate the carbon-dioxid and the water-vapor, to raise the temperature of the gas and to replace the heat lost in radiation, etc., two poles (or a plurality of pairs of poles) are placed in contact with the coke or charcoal and connected to a transformer arranged so that two or more different secondary voltages can be provided. An electric current is then passed through the mass of coke or charcoal and the temperature is raised or lowered as required by means of passing through currents of higher or lower voltage. When an electric current is thus passed through a mass of coke or charcoal the electric energy is, on account of the higher resistance of the coke or charcoal, converted into heat and the heat produced per time unit (and the temperature) is controlled at will by changing the voltage of the current passing through the coke or charcoal, as more or less current is thus passed through said material per time unit and consequently also more or less heat produced per time unit. Carbon-dioxid and water-vapor will, when passing through an incandescent body of carbonaceous matter at a temperature of at least 1000° C., dissociate and each take up an atom of carbon

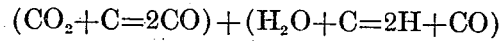

and be converted into carbon-monoxid and hydrogen.

The principal advantages of this improved process are; that a gas practically free from nitrogen (which is a dilutant), oxygen and carbon-dioxid (which causes reoxidation) and, therefore, of the highest possible efficiency as a reducing-agent, can be produced; that the temperature of the gas leaving the producing apparatus can be varied and brought up to about 1600° C.; and that the incoming gas, being preheated to a temperature approximating that at which dissociation occurs, will be dissociated in the lower zone of the coke so that combustion will occur in that zone. This latter is an important feature of the process for the reason that, if the incoming gas entered the furnace at a comparatively low temperature, it would have to pass through the lower zone of coke and be therein elevated in temperature before the oxygen required for the combustion of the coke would be liberated. Consequently the ashes would form above the lower zone of coke, which would render the process uneconomical and inefficient.

If coke or charcoal is used as fuel, the gas produced will contain practically only carbon-monoxid and hydrogen, but if uncoked or uncoaled fuel is used, the gas will contain carbon-monoxid and hydrogen mixed with the volatile matters (mainly hydrogen and hydrocarbons) which are, in the upper part of the apparatus, driven off from the fresh fuel automatically and continuously charged into the apparatus, and the gas will in both cases be practically free from nitrogen, oxygen and carbon-dioxid.

I will now describe the apparatus which I prefer to employ for the purpose of practising the process hereinbefore described.

Figure 2:
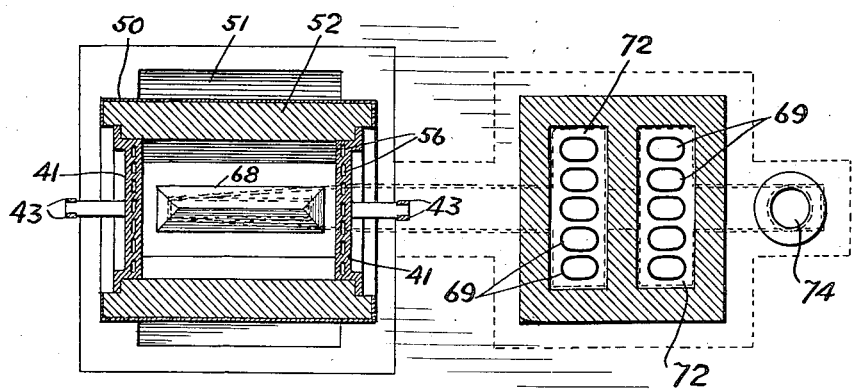
Figure 3:
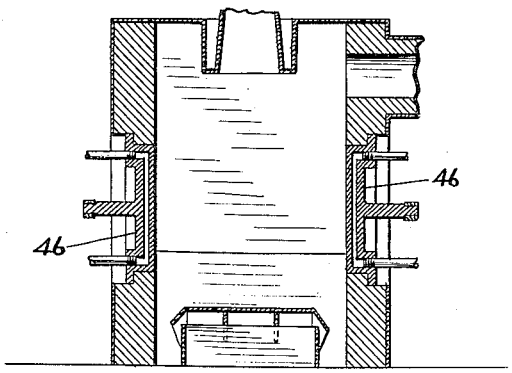

In the drawings: Figure 1 is a vertical sectional view of the apparatus; Fig. 2 is a section on the line 2—2 of Fig. 1; Fig. 3 is a vertical sectional view of part of a modified furnace.

The apparatus consists of a rectangular shell 50 of cast iron, two sides of which are straight while the other two sides slope toward each other, at the lower part set in a waterpan 51. The shell 50 is lined with fire or silica brick 52 and in the two straight sides are set two pairs of cast iron plates or poles 40 and 41 connected by leads 42 and 43 with transformers 44 and 45. Within the poles 40 and 41 are water channels 56 connected by pipes 57 with a source of water supply. The electric current passes from each transformer to the corresponding pole of a pair, thence through the adjacent mass of coke or charcoal to the other pole of said pair and thence back to the transformer.

The transformers receive their current from any convenient source of supply and the temperature in the furnace is controlled and regulated, as hereinbefore described, by connecting the primary leads so as to produce different secondary voltages. These poles must be made of material having less resistance or higher conductivity than the material to be heated in which, according to its higher resistance, the heat is produced by the current passing through. Cast-iron, wrought-iron, steel, copper and nickel, etc., are all equally good when the fuel consists of peat, coal or wood. The top of the apparatus is covered with a shallow cast iron pan 60, filled with water, and made in one piece with the lower funnel shaped part 61 of the coal hopper, consisting of the two parts 62 and 63, separated by a bottom 64 with bell 65 and a water sealed top 66. The twyer 67 is of rectangular form, covered with a mushroom shaped top 68 and connected with preheating pipes 69 and an inlet pipe 74, through which the spent gas is forced into the apparatus. In the upper part of the apparatus is a flue 70, which, through a valve 71, communicates with the preheating chambers 72 from which leads the flue 73, through which the produced gas is carried into the apparatus in which it is to be used.

In starting the operation, the apparatus is filled to the upper end of the upper poles 40 with coke and the electric current is turned on and heat, as previously described, produced in the coke. When the mass of coke and the apparatus has been slowly heated up, the temperature in the coke is regulated to about 1000–1100° C., the apparatus filled with the fuel to be used and the spent gas allowed to enter the apparatus through twyers 67, when the production of gas is started and then proceeds continuously.

The fuel is charged into part 62 of the hopper and by bell 65 removed into part 63 as soon as this is nearly empty from where it is further continuously and automatically fed into the apparatus through funnel 61 as the fuel is gradually consumed and shrinks, and the ashes that collect in the waterpan 51 are removed as desired.

The spent gas, or (if water gas is to be produced) the steam, is forced under pressure through inlet pipe 74, preheating pipes 69 and twyers 67 into the apparatus and through the superheated mass of the incandescent carbonaceous material. When passing through this heated mass of incandescent carbonaceous material, the carbon dioxid and the water-vapor of the preheated spent gas, or the superheated steam, are converted into carbon-monoxid and hydrogen, as previously described, and the gas, by regulating the production of heat in the coke, superheated to any temperature desired. These gases are in the upper part of the apparatus mixed with the volatile matters (mainly hydrogen and hydrocarbons) which are there driven off from the fresh fuel fed into the apparatus, and then, through flue 70, valve 71, preheaters 72 and flue 73, led out of the apparatus and into the apparatus in which the gas is to be used.

The spent gas is, on its way to the apparatus, preheated in preheating-pipes 69 by the excess heat carried by the outgoing gas, part of which heat is in preheaters 72 carried through the walls of preheating pipes 69 and absorbed by the cold spent gas passing through these pipes simultaneously with the outgoing hot fresh gas passing outside of said pipes through preheaters 72 on its way out from the apparatus; and the spent gas should be preheated to as near 1000° C. as possible.

The velocity by which the gas is driven through the apparatus, and the production of heat in the fuel, are regulated in such a way that the gas is given time enough in which to carbonize and to absorb the heat, during its passage through the heated fuel, and a sufficient quantity of heat is produced in the coke to provide for the amount of heat needed to give the gas the temperature described.

While I have illustrated two pairs of poles in the apparatus hereinbefore described, a single pair of poles, 46, as shown in Fig. 3, may be substituted. If a single pair of poles is employed, only a single transformer is of course necessary. The employment of a plurality of pairs of poles is, however, preferred for the following reasons: To accomplish a complete carbonization of $H_2O$ and $CO_2$ a constant temperature of at least 1000°

C. (1000–1100° C.) is required in the dissociation and carbonization zone of the apparatus (that is, the part located between the lower poles 41), but the temperature in the preheating zone of the apparatus (that is, the part located between the upper poles 40) should be varied according to the desired temperature of the outgoing fresh converted gas. If, for example, it is desired to impart a temperature of 1500° C. to the outgoing gas, the temperature in the superheating zone should be kept at more than 1500° C. To impart this temperature to the outgoing gas in an apparatus in which only one pair of poles is used, the temperature would have to be kept at 1500° C. even in the dissociation zone, which would mean an unnecessary waste of electric energy. If, on the other hand, a temperature, for example of only 500° C. for the outgoing gas is desired the temperature in the superheating zone must be kept at a much lower point, in order to cool off the gas which would leave the dissociation zone at about 1000° C. This would naturally be impossible if only one pair of poles were used. It would then be impossible to accomplish the cooling down of the gas in the apparatus itself and the waste of electric energy would be considerable.

While in the claims I have specified passing the gas to be converted through coke and coal, I, of course, do not intend to exclude the employment of other equivalent carbonaceous materials such as charcoal in place of coke and wood or peat in place of coal.

Having now fully described my invention, what I claim and desire to protect by Letters Patent is:—

1. The method of carbonizing and superheating gas consisting of preheating said gas, passing an electric current through a body of coke to maintain it incandescent at the desired temperature and simultaneously therewith passing said preheated gas through said coke while substantially preventing access of air.

2. The method of carbonizing and superheating gas consisting in passing an electric current through a body of coke to maintain it incandescent at the desired temperature, establishing a current of gas through said coke and leading the outgoing gas in proximity to the incoming gas to elevate the temperature of the latter.

3. The method of carbonizing and superheating gas consisting in preheating said gas, passing it successively through heated coke and coal, passing an electric current through the body of coke to maintain it incandescent at the desired temperature, and feeding the coke and coal (as the latter is converted into coke and finally consumed) in a direction opposite to the flow of gas therethrough.

4. The method of carbonizing and superheating gas consisting in preheating the gas, establishing a plurality of electric circuits respectively through contiguous masses of coke, independently regulating said circuits to maintain said masses incandescent at different temperatures, and passing the preheated gas to be treated successively through the coke mass of lower temperature and the coke mass of higher temperature.

5. The method of carbonizing and superheating gas consisting in preheating the gas, establishing a plurality of electric circuits respectively through contiguous masses of coke, independently regulating said circuits to maintain said masses incandescent at different temperatures, passing the gas to be treated successively through the coke mass of lower temperature, the coke mass of higher temperature and a contiguous mass of heated fresh fuel contiguous to the coke mass of higher temperature.

6. The herein described continuous process of producing gas, which consists in creating and maintaining a zone of high temperature in a body of carbonaceous material contained in a producer by the action of electric currents between electrodes so disposed as to use the carbonaceous material as a resistance medium, introducing into the mass of carbonaceous material highly heated waste gases of combustion whereby the carbon-dioxid of the hot waste gases of combustion are disassociated to form carbon-monoxid therefrom together with a fresh amount of carbon-monoxid from the carbonaceous matter.

7. The herein described continuous process of producing gas which consists in creating and maintaining zones of high temperature in a body of carbonaceous material contained in a producer by the action of electric currents between electrodes so disposed as to use the carbonaceous material as a resistance medium, regulating the temperatures of said zones, introducing into the mass of carbonaceous material highly heated waste gases of combustion whereby the carbon-dioxid of the hot waste gases of combustion are disassociated to form carbon-monoxid therefrom together with a fresh amount of carbon-monoxid from the carbonaceous matter.

In testimony of which invention, I have hereunto set my hand, at Chicago, Ill., on this 29th day of October, 1910.

ALGOT BERGLOF.

Witnesses:
 DAVID H. FLETCHER,
 JENNIE L. FISKE.